(12) United States Patent
Krefting

(10) Patent No.: US 11,001,334 B2
(45) Date of Patent: May 11, 2021

(54) EXTERNAL DAMPING ADJUSTMENT APPARATUS AND METHOD FOR SUSPENSION SYSTEM

(71) Applicant: Kreft, LLC, Bend, OR (US)

(72) Inventor: Adam Krefting, Bend, OR (US)

(73) Assignee: Kreft, LLC, Bend, OR (US)

( * ) Notice: Subject to any disclaimer, the term of this patent is extended or adjusted under 35 U.S.C. 154(b) by 180 days.

(21) Appl. No.: 16/164,340

(22) Filed: Oct. 18, 2018

(65) Prior Publication Data

US 2019/0111993 A1 Apr. 18, 2019

Related U.S. Application Data

(60) Provisional application No. 62/573,722, filed on Oct. 18, 2017.

(51) Int. Cl.
| | |
|---|---|
| *F16F 9/46* | (2006.01) |
| *B62K 25/08* | (2006.01) |
| *B60G 17/06* | (2006.01) |
| *B62K 25/28* | (2006.01) |
| *B62K 25/04* | (2006.01) |

(52) U.S. Cl.
CPC .............. *B62K 25/08* (2013.01); *B60G 17/06* (2013.01); *B62K 25/283* (2013.01); *B60G 2300/12* (2013.01); *B60G 2500/11* (2013.01); *B62K 2025/048* (2013.01)

(58) Field of Classification Search
CPC ........ F16F 9/18; F16F 9/34; F16F 9/44; F16F 9/46; F16F 9/466; F16F 9/462; B62K 25/08; B62K 25/283; B62K 2025/048; B60G 17/08; B60G 2300/12; B60G 2500/11
See application file for complete search history.

(56) References Cited

U.S. PATENT DOCUMENTS

| | | | | |
|---|---|---|---|---|
| 5,133,434 A | * | 7/1992 | Kikushima | ............. F16F 9/464 |
| | | | | 137/493.9 |
| 6,592,136 B2 | * | 7/2003 | Becker | .................. B62K 25/08 |
| | | | | 280/276 |
| 6,986,414 B2 | * | 1/2006 | Honig | ..................... F16F 9/467 |
| | | | | 188/282.9 |
| 8,235,187 B2 | * | 8/2012 | Murakami | ............. F16F 9/462 |
| | | | | 188/285 |

(Continued)

*Primary Examiner* — Thomas W Irvin
(74) *Attorney, Agent, or Firm* — Hancock Hughey LLP

(57) ABSTRACT

A mechanism and method for externally adjusting the mid-valve stiffness is described and enables adjustment of a mid-valve functionality without disassembly of a suspension system incorporating the invention. The effect of this adjustment on the damping curve is far greater than either low-speed compression adjusters or conventional high-speed compression adjusters. The apparatus combines the valve-stiffening system of a high speed compression adjuster with the sensitivity of the mid-valve. Externally accessible adjustment members are operatively coupled to the mid-valve components located internally in a fork so that manipulation of the adjustment members causes adjustment of the mid-valve and the damping force created by the mid-valve. The apparatus may be utilized in closed cartridge suspension forks (CCSF) and open cartridge suspension forks (OCSF) and other shocks or suspension dampers.

24 Claims, 13 Drawing Sheets

(56) References Cited

U.S. PATENT DOCUMENTS

| | | | | |
|---|---|---|---|---|
| 8,356,829 B2* | 1/2013 | Shirai | F16F 13/002 | 280/283 |
| 8,672,106 B2* | 3/2014 | Laird | F16F 9/34 | 188/275 |
| 8,869,959 B2* | 10/2014 | Yablon | B60G 13/10 | 188/319.1 |
| 9,188,188 B2* | 11/2015 | Yablon | B62K 25/08 | |
| 9,328,790 B2* | 5/2016 | Shimasaki | F16F 9/185 | |
| 9,541,152 B2* | 1/2017 | Yoshida | F16F 9/341 | |
| 9,586,645 B2* | 3/2017 | Becker | F16F 9/44 | |
| 9,663,181 B2* | 5/2017 | Ericksen | B60G 17/08 | |
| 10,160,511 B2* | 12/2018 | Ericksen | B62K 25/08 | |
| 10,202,167 B2* | 2/2019 | Tomiuga | B62K 25/08 | |
| 10,221,914 B2* | 3/2019 | Yablon | F16F 9/44 | |
| 10,370,059 B2* | 8/2019 | Tomiuga | B62K 25/08 | |
| 10,723,409 B2* | 7/2020 | Ericksen | B60G 17/08 | |
| 10,731,724 B2* | 8/2020 | Laird | F16F 9/18 | |
| 2003/0001358 A1* | 1/2003 | Becker | B62K 25/06 | 280/276 |
| 2003/0173170 A1* | 9/2003 | Nagai | F16F 9/185 | 188/316 |
| 2008/0230335 A1* | 9/2008 | Furuya | F16F 9/462 | 188/315 |
| 2009/0001684 A1* | 1/2009 | McAndrews | F16F 9/466 | 280/276 |
| 2009/0084644 A1* | 4/2009 | Murakami | F16F 9/462 | 188/266.6 |
| 2009/0266656 A1* | 10/2009 | Murakami | F16F 9/56 | 188/266.1 |
| 2009/0266657 A1* | 10/2009 | Murakami | F16F 9/461 | 188/266.1 |
| 2010/0044975 A1* | 2/2010 | Yablon | F16F 9/44 | 280/5.503 |
| 2010/0225081 A1* | 9/2010 | Galasso | F16F 9/185 | 280/124.1 |
| 2011/0083930 A1* | 4/2011 | Laird | F16F 9/275 | 188/275 |
| 2011/0121525 A1* | 5/2011 | Shirai | F16F 13/002 | 280/5.515 |
| 2014/0069755 A1* | 3/2014 | Laird | F16F 9/464 | 188/322.15 |
| 2014/0210146 A1* | 7/2014 | Aoki | F16F 9/0236 | 267/64.11 |
| 2014/0252706 A1* | 9/2014 | Kamioka | B60G 15/061 | 267/217 |
| 2015/0096852 A1* | 4/2015 | Yoshida | B62K 25/08 | 188/297 |
| 2016/0040741 A1* | 2/2016 | Laird | F16F 9/464 | 188/322.15 |
| 2016/0116014 A1* | 4/2016 | Xu | F16F 9/067 | 188/269 |
| 2017/0284499 A1* | 10/2017 | Yablon | B60G 13/10 | |
| 2019/0145483 A1* | 5/2019 | Laird | F16F 9/34 | 188/322.15 |
| 2019/0383348 A1* | 12/2019 | Pegoraro | F16F 9/061 | |

* cited by examiner

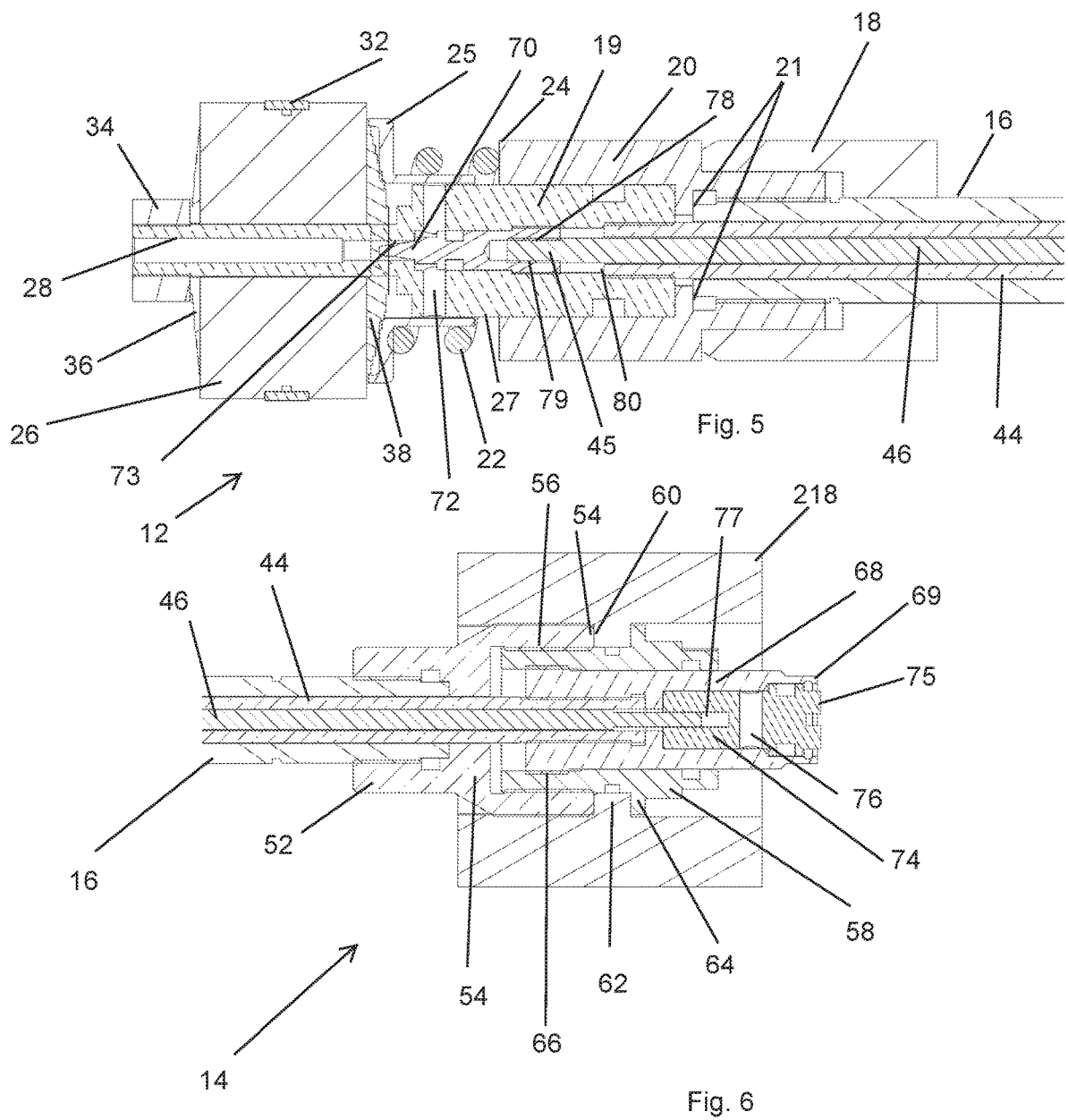

EXTERNAL DAMPING ADJUSTMENT APPARATUS AND METHOD FOR SUSPENSION SYSTEM

TECHNICAL FIELD

The present invention is in the field of vehicle suspension systems. More specifically, the invention relates to suspension forks or shocks used on motorcycles and bicycles and an externally accessible damping adjustment system applicable to suspension forks and which allows for adjustment of damping without disassembly of the suspension fork.

BACKGROUND OF THE INVENTION

A suspension system is composed of a spring and a damper. The spring supports the load, and the damper dissipates energy from bumps. Modern suspension components generate damping, or resistance to movement, through a system of valves that regulate the flow of oil within the damper. As the suspension compresses and extends, pressure differences between chambers in the damper forces oil to flow through valves from the high pressure chamber to the low pressure chamber. The valves are partially blocked by a stack of flexible steel washers called "shims," which help maintain the pressure differential, but allow a metered amount of oil to flow through. As pressure differential builds up across the valve, the outer edge of the shims begin to bend away from the valve face, enabling oil to flow through. Oil flow characteristics are determined by the number and shape of ports through the valve bodies, and the stiffness of the shims covering the ports. The greater the restriction to oil flow, the more damping force is generated.

Modern performance suspension dampers can be extremely complex. The paragraph above describes a simple suspension damper.

Low-Speed Damping Adjusters

Among the many innovations and improvements to suspension components, various external damping adjusters have been developed. External damping adjustments enable the user to fine-tune the suspension without disassembly. The most common type of damping adjuster is a needle and orifice valve that bypasses the main shim-controlled valve.

These adjusters are often called "clickers" because of the detent mechanism that makes them move in defined increments with a click. When the adjuster is fully closed, the needle shuts off oil flow through the orifice. As the adjuster is opened, the needle backs out the orifice and more oil can flow through.

Clickers change damping force by about the same amount at all suspension velocities. Proportionally speaking, they have a much greater effect on low speed damping because the total damping force is small at low speeds. For example, a two-pound change in damping force created by the adjuster is more significant when total damping force is five pounds rather than fifty pounds. For that reason, clickers are primarily low-speed damping adjusters. They have no direct effect on the main valves.

High Speed Compression Adjusters

A different type of damping adjuster is typically referred to as a "high speed compression adjuster." This type is commonly found on shock absorbers rather that suspension forks, although some models of suspension forks use an adaptation of the design.

Rather than regulating the fluid flow bypassing the valve, a high speed adjuster provides a means of externally stiffening a shim stack. Typically, this involves a screw or dial mounted externally on the suspension that can vary the load on an adjustment spring, which in turn transmits spring force to the shim stack through a pressure plate. The pressure plate can augment the stiffness of the shim stack according to the spring force applied by the adjustment spring. The pressure plate may apply pressure to the outermost shim, or to any of the other shims in the shim stack except for the smallest shim. If it presses against the outermost shim, the spring increases the force required to lift the shim edge and open the valve. If the pressure plate presses against any smaller diameter shim (except for the smallest shim), the spring force partially changes to the fulcrum point that the other shims bend around, reducing shim bending leverage and thereby stiffening the shim stack. Regardless of the precise mechanism used to achieve adjustment, the principle remains the same.

Because the high speed adjuster stiffens the shim stack, it alters the slope of the damping curve (a plot of suspension velocity vs. damping force). This is an important distinction from the vertical shift (y-axis displacement) of the damping curve introduced by low-speed adjusters. In practice, high speed adjusters usually affect damping force at all suspension shaft velocities and are not actually confined to high-velocity suspension movements.

A common high speed adjuster design incorporates both a high speed adjuster and a low speed adjuster into a single valve. The low speed adjuster needle and orifice is located at the center of the valve, with a high speed spring and pressure plate positioned concentric with the low speed adjuster screw. In the industry, this is called a dual compression control adjuster.

High speed adjusters in use today are always located at the base valve, in part because the base valve is physically connected to the damper adjacent to an externally visible portion of the damper housing. This makes it a practical and accessible location to locate a complex adjuster mechanism.

Types of Compression Valves

Shock absorbers and many types of suspension forks use two different valves to generate compression damping. The nomenclature varies, but herein they will be referred to as the "base valve" and the "mid-valve," terms which are typical in describing cartridge forks. The base valve controls fluid flow that results from the damping rod entering the cartridge during a compression stroke, and displacing fluid from the cartridge. The displaced volume of fluid exits the cartridge through the base valve. When the fork extends, a check valve on the opposite side of the base valve opens and allows fluid to refill the cartridge with minimal resistance. Thus, the base valve functions only as a compression valve. It is attached to the end of the cartridge in a fixed position relative to externally visible parts of a suspension fork. In unsealed "open cartridge" fork designs, the base valve is located at the bottom of the fork near the axle lug. In sealed "closed cartridge" fork designs, the base valve is usually located at the top of the fork.

The mid-valve is attached to the end of the damping rod, deep within the central body of the damper. It is not directly connected to any external portion of the damper housing, but rather is connected to the damper housing at the opposite end of the damping rod. The mid-valve cycles back and forth inside the cartridge as the suspension compresses and rebounds. It is a bi-directional valve, meaning it generates damping force both when the damper compresses and when it extends (compression force as the fork is compressed, and rebound force as the fork extends). To accomplish this, the valve body has two sets of ports and two sets of shims oriented on opposite sides of the piston face. Unlike the base valve, fluid flow through the valve does not depend on fluid displaced by the damping rod as it enters the cartridge. It moves "through" the fluid with suspension movement. A larger volume of oil flows through the mid-valve compared to the base valve, so other factors being equal, it can generate more damping force than the base valve.

In traditional configurations, the rebound-side shim stack is fixed securely to the piston face, but the mid-valve shim stack is setup with "float". Float means that during a compression stroke the shims can freely move a fixed distance away from the piston face before reaching a hard stop, whereupon the shim stack begins to generate a damping force. Float values are often very small, in the range of 0.5 mm, but that small float gap greatly reduces the compression damping force the valve generates. With a floating shim stack, the mid-valve can be configured to produce little or no damping force at low velocities, but high damping forces at mid- or high-velocity movements.

The floating shim stack technique is common because the mid-valve is extremely sensitive. Since it passes a larger volume of fluid compared with the base valve, it has the potential to generate more damping force and have a greater effect on overall compression damping forces. In applications where higher damping rates are required, such as high-leverage rear shock absorbers for motorcycles, the mid-valve shim stack is fixed securely to the piston face.

Rebound Adjusters

A rebound adjuster is a needle and orifice valve located at the mid-valve. With exception to unique designs, fluid flows both direction through the valve, and therefore it affects compression damping as well as rebound damping. However, the effect on rebound damping is much more significant than compression damping. This is because the rebound valve shim stack is attached securely to the piston face, not floating, so the valve effectively seals off low-pressure fluid flow. Consequently, even a small fluid leak through the bypass can have a significant impact on damping force. On the other hand, a mid-valve configured with float has no ability to prevent low-pressure fluid flow, so the bypass orifice is insignificant in comparison.

With current damper designs, the only effective way to adjust mid-valve compression damping is to disassemble the damper and change the mid-valve compression shim stack. Most people who use these products do not have the specialized knowledge and tools, not to mention the time, necessary to complete such a complex modification. While modern suspension components offer effective and easy-to-access adjustment capabilities for all other damping circuits (rebound and base valve compression), so far, none have an effective means of externally adjusting mid-valve compression damping. Without the ability to adjust mid-valve compression, the end user's ability to tune suspension for varying conditions or preferences is extremely limited.

The overall damping curve is highly sensitive to adjustments of mid-valve stiffness. Vehicle manufacturers and suspension tuners choose the shim setting carefully to yield the desired damping characteristics.

SUMMARY OF THE INVENTION

The present invention discloses an apparatus and method for externally adjusting the mid-valve damping stiffness so that the end user is able to tune his suspension system more effectively. The external adjustment mechanisms disclosed here eliminate the need to disassemble the damper in order to adjust mid-valve stiffness. The effect of this adjustment on the damping curve is larger than either low-speed compression adjusters or conventional high-speed compression adjusters. It combines the valve-stiffening system of a high speed compression adjuster with the sensitivity of the mid-valve. In combination with a traditional low-speed compression adjuster, the user has independent control of both the slope and the vertical shift of the damping curve. Together, these provide near complete control of compression damping behavior without the need for expert knowledge or time-consuming disassembly of the damper.

As noted previously, the base valve is usually secured near the end of a fork leg. This means the base valve is easier to access, requires smaller and simpler parts, and has more space available in which to install concentric adjustment systems. The mid-valve is attached to the end of a long slender damping rod, remote from its connection to the structural body of the damper. Accessing it is challenging. The problem is further complicated by the fact that the rebound adjuster mechanism resides at the same location. Adding an additional adjustment feature at the mid-valve requires a series of long concentric rods that move inside one another and can adjust both mid-valve stiffness and rebound damping independently.

As detailed herein and as illustrated in the drawings, the adjustment mechanism according to the invention may be beneficially used in both closed cartridge suspension forks ("CCSF") and open cartridge suspension forks ("OCSF").

BRIEF DESCRIPTION OF THE DRAWINGS

Further features and advantages of the present invention will become apparent from the following detailed description, taken in combination with the appended drawing, in which:

FIG. 1 is a longitudinal cross sectional view of a CCSF showing the components of the fork and the external mid-valve adjustment system according to the present invention.

FIG. 2 is a cross sectional view of the "lower" end of the CCSF shown in FIG. 1, showing the external mid-valve adjustment system according to the present invention.

FIG. 3 is a close up cross sectional view of the CCSF shown in FIG. 1 and illustrating the mid-valve portion of the external mid-valve adjustment system according to the present invention.

FIG. 4 is a close up cross sectional view of the CCSF shown in FIG. 1 and illustrating the adjuster portion of the external mid-valve adjustment system according to the present invention.

FIG. 5 is a cross sectional view of the mid-valve portion of the mid-valve adjustment system according to the invention, in which the mid-valve portion is shown in isolation without the cartridge tube. In FIG. 5 the pressure plate is in contact with and bearing on the mid-valve shims.

FIG. 6 is a cross sectional view of the adjuster portion of the mid-valve adjustment system according to the invention, in which the adjustment portion is shown in isolation without the fork lug or shock tube.

FIG. 10 is a plot of the adjustment range for a CCSF fork including a mid-valve adjustment mechanism according to the present invention.

FIG. 11 is a plot of the adjustment range for a CCSF fork that is fitted with a conventional compression adjuster.

FIG. 12 is a longitudinal cross sectional view of an OCSF showing the components of the fork and the external mid-valve adjustment system according to the present invention.

FIG. 13 is a cross sectional view of the "upper" end of the OCSF shown in FIG. 12, illustrating the external mid-valve adjustment system according to the present invention.

FIG. 14 is a close up cross sectional view of the OCSF shown in FIG. 12 and illustrating the mid-valve portion of the external mid-valve adjustment system according to the present invention.

FIG. 15 is a close up cross sectional view of the OCSF shown in FIG. 12 and illustrating the adjuster portion of the external mid-valve adjustment system according to the present invention.

FIG. 16 is a plot of the adjustment range for an OCSF fork including a mid-valve adjustment mechanism according to the present invention.

FIG. 17 is a plot of the adjustment range for an OCSF fork that is fitted with a conventional compression adjuster.

DETAILED DESCRIPTION OF PREFERRED AND ILLUSTRATED EMBODIMENTS

Figure 1:
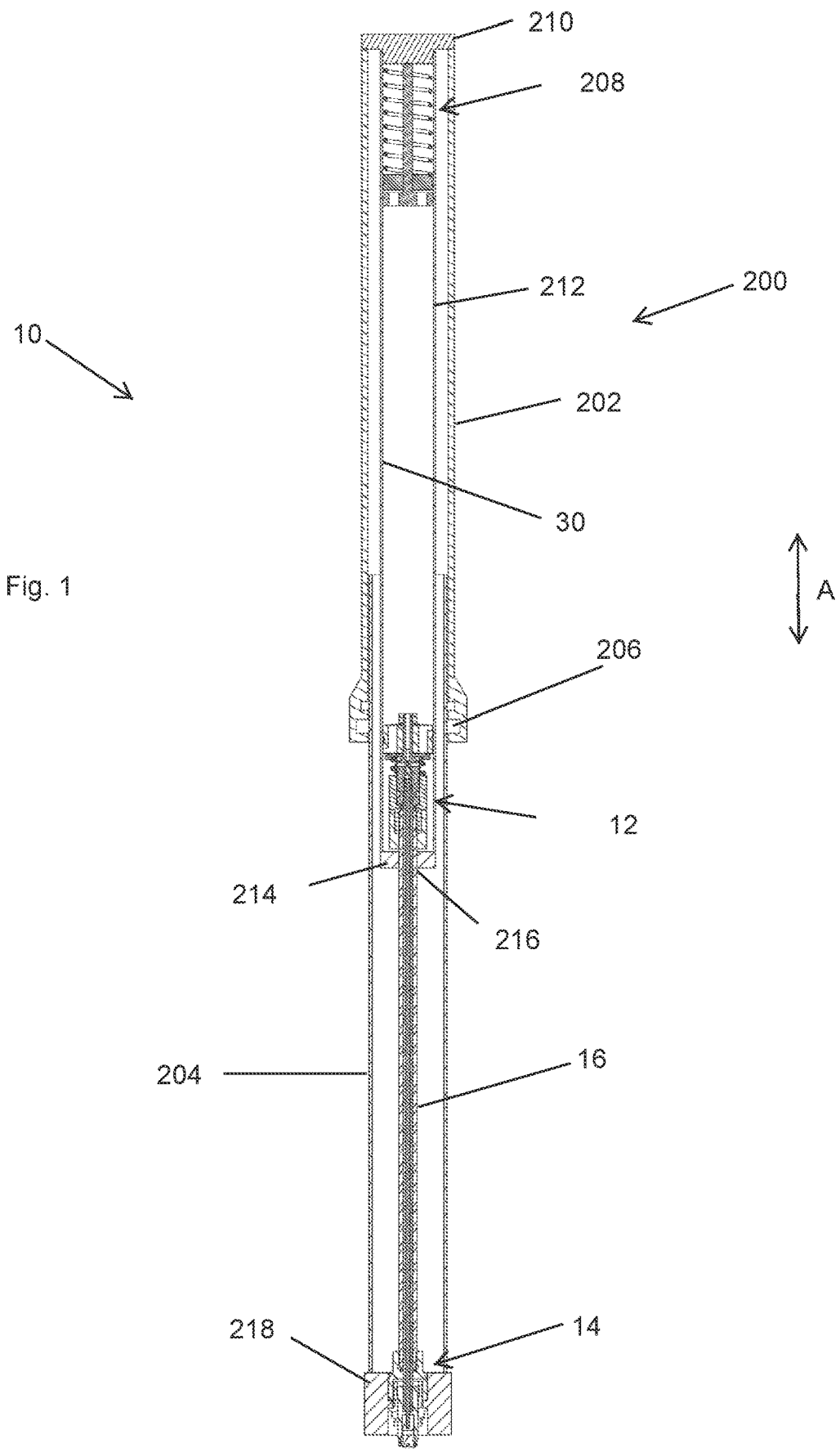
FIGS. 1 through 4 illustrate the external mid-valve adjustment system according to the present invention as it is embodied in a "closed cartridge suspension fork" ("CCSF"), in which some of the components of the fork are shown to provide environment. Specifically.

Relative directional terms are used at times in this description to describe components of the invention and relative positions of the parts. As a naming convention, the ground plane is considered to be the generally horizontal surface on which a vehicle such as a motorcycle with which the present invention is utilized may operate. Relative directional terms correspond to this convention: "upper" refers to the direction above and away from the ground plane; "lower" is generally in the opposite direction, "inward" is the direction from the exterior toward the interior of the apparatus or a component thereof, "vertical" is the direction normal to the horizontal ground plane, and so on.

1. CCSF; Closed Cartridge Suspension Fork

With reference now to the drawings and specifically to FIGS. 1 through 4, a closed cartridge suspension fork embodiment of the external mid-valve adjustment system according to the present invention is illustrated along with typical components of one fork leg to describe the general environment in which the invention is used. In this description, the external mid-valve adjustment system according to the invention (also referred to in the shorthand as adjustment mechanism 10 and at times, "revalve adjuster") is identified generally with reference number 10. Adjustment mechanism 10 resides within fork 200, which includes an outer fork tube 202 and an inner fork tube 204 that is reciprocally slidable within the outer fork tube and which is sealed with, for instance, a seal 206. In a CCSF the base valve assembly is retained in a cartridge tube 212 that is coaxially retained in outer fork tube 202 and fixed in the outer fork tube at the outer (i.e., upper) end thereof, and which serves as a piston guide. The outer end of the outer fork tube is covered with a fork cap 210 and the fork cap secures the cartridge tube to the cap. On a vehicle such as a motorcycle, the outer fork tube 202 is positioned vertically above the inner fork tube 204, so utilizing the naming convention used in this description the outer fork tube 202 is "above" the inner fork tube 204. The lowermost end of cartridge tube 212 extends into the inner fork tube 204 as shown and includes a base 214 that has a bore 216.

The lower end of inner fork tube 204 comprises the fork lug 218 that is adapted to attach the fork 200 to the axle of a motorcycle (not shown but conventional).

The adjustment mechanism 10 comprises an elongate assembly that has a mid-valve assembly 12 at one end thereof, and a adjuster assembly 14 at the opposite end. The mid-valve assembly and the adjuster assembly 14 are interconnected with a damper rod 16, which as described below carries in its interior two separately rotatable rods that enable the user to adjust the mid-valve and rebound performance. The damper rod 16 effectively fixes the location of the mid-valve assembly 12 in the fork tube. The adjuster assembly 14 is fixed in the inner tube 204 at fork lug 218 and includes externally accessible adjustment mechanisms as described in detail below that allow the user to independently adjust the mid-valve and rebound performance. The mid-valve assembly 12 resides internally in the cartridge tube 212—the damper rod 16 extends through the bore 216 in base 214.

The mid-valve assembly 12 is attached to the upper end of the damping rod 16. The assembly 12 is not directly connected to any external portion of the fork and cycles back and forth inside the cartridge tube 212 as the suspension compresses and rebounds. The mid-valve assembly 12 is a bi-directional valve: it generates damping force both when the damper compresses and when it extends (compression force as the fork is compressed, and rebound force as the fork extends). To accomplish this, as detailed below, the mid-valve assembly incorporates two sets of ports and two sets of shims oriented on opposite sides of a piston face. Unlike the base valve, fluid flow through the mid-valve assembly 12 does not depend on fluid displaced by the damping rod as it enters the cartridge. A larger volume of oil flows through the mid-valve assembly compared to the base valve assembly, so other factors being equal, the mid-valve assembly can generate more damping force than the base valve.

It will be appreciated that in use the outer fork tube 202 of fork 200 is fixed to the motorcycle frame. The motorcycle wheel is mounted to fork lug 218 and as the wheel encounters uneven surfaces during movement the inner fork tube 204 slides reciprocally into and out of outer fork tube 202

(arrows A, FIG. 1). This reciprocal movement inner fork tube 204 causes reciprocal movement of adjustment assembly 10, as detailed below.

Figure 2:
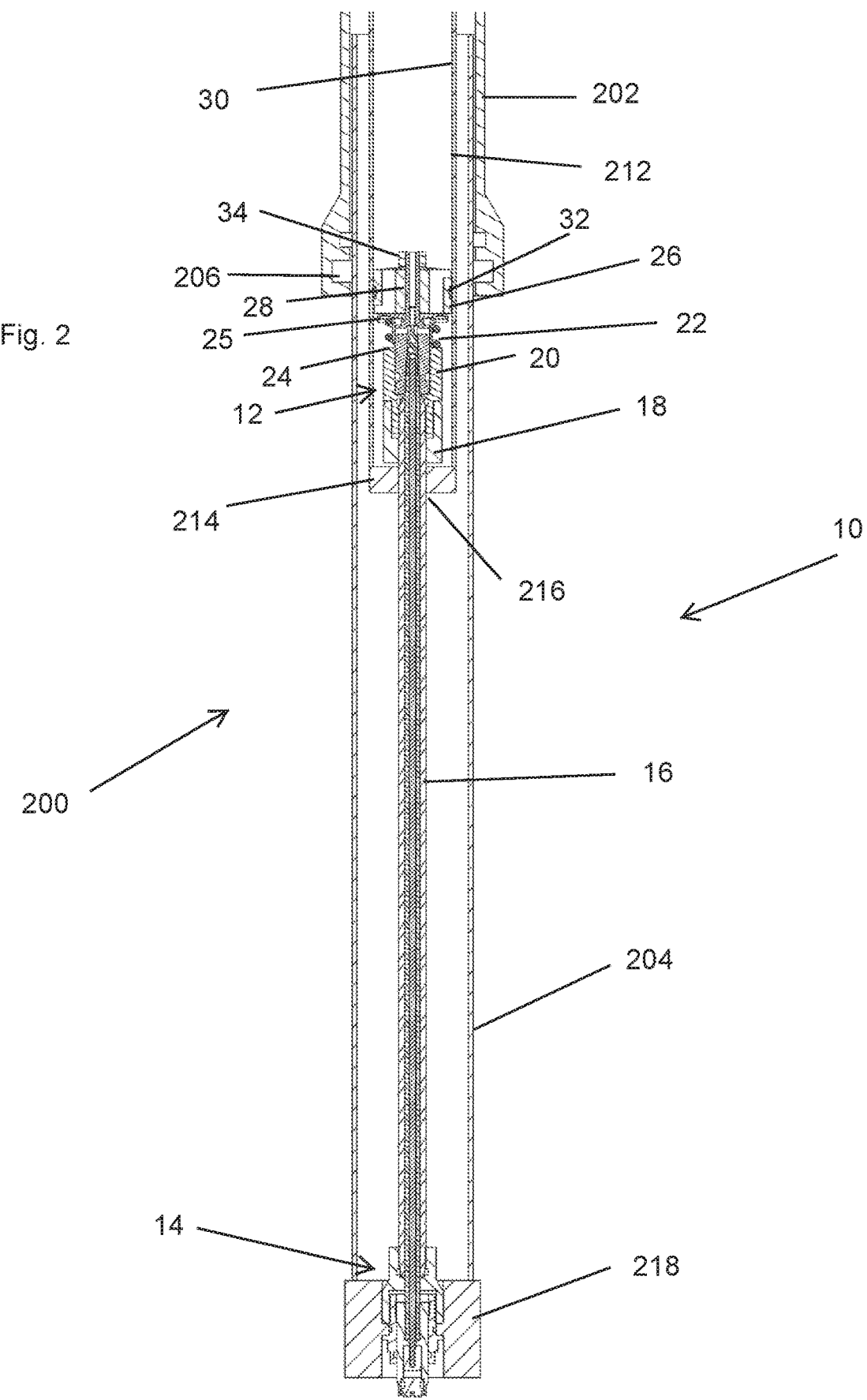
Figure 3:
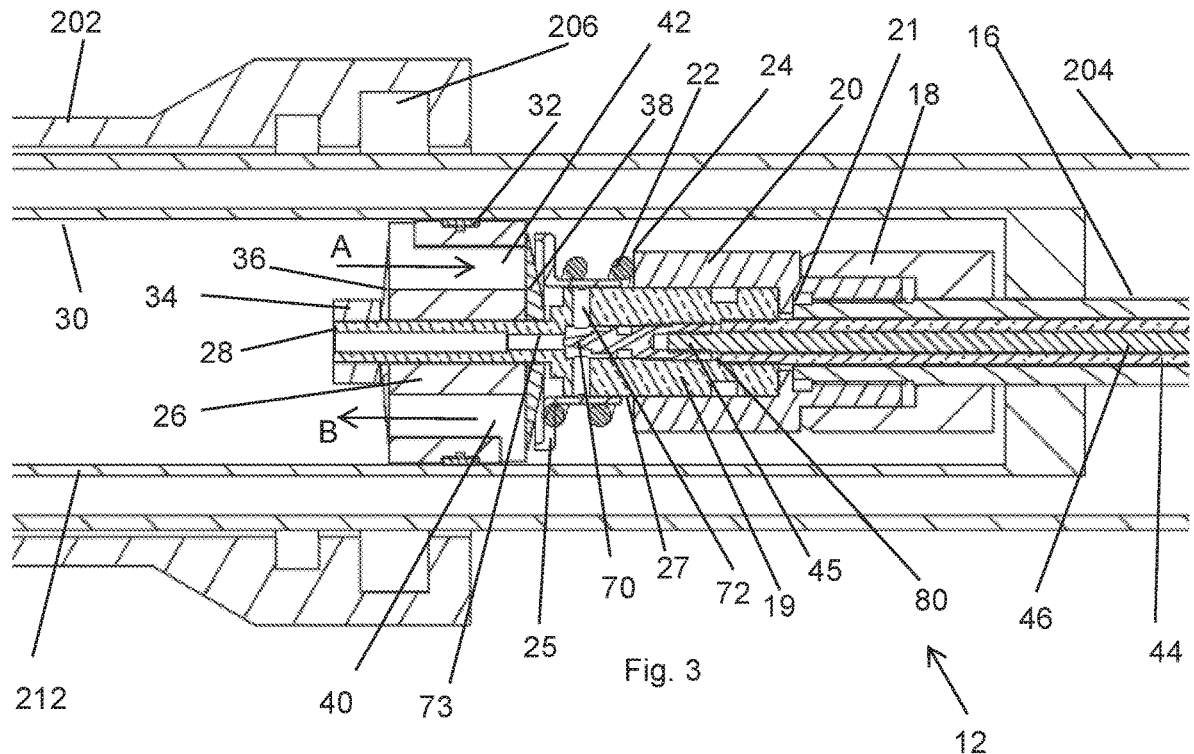
Figure 4:
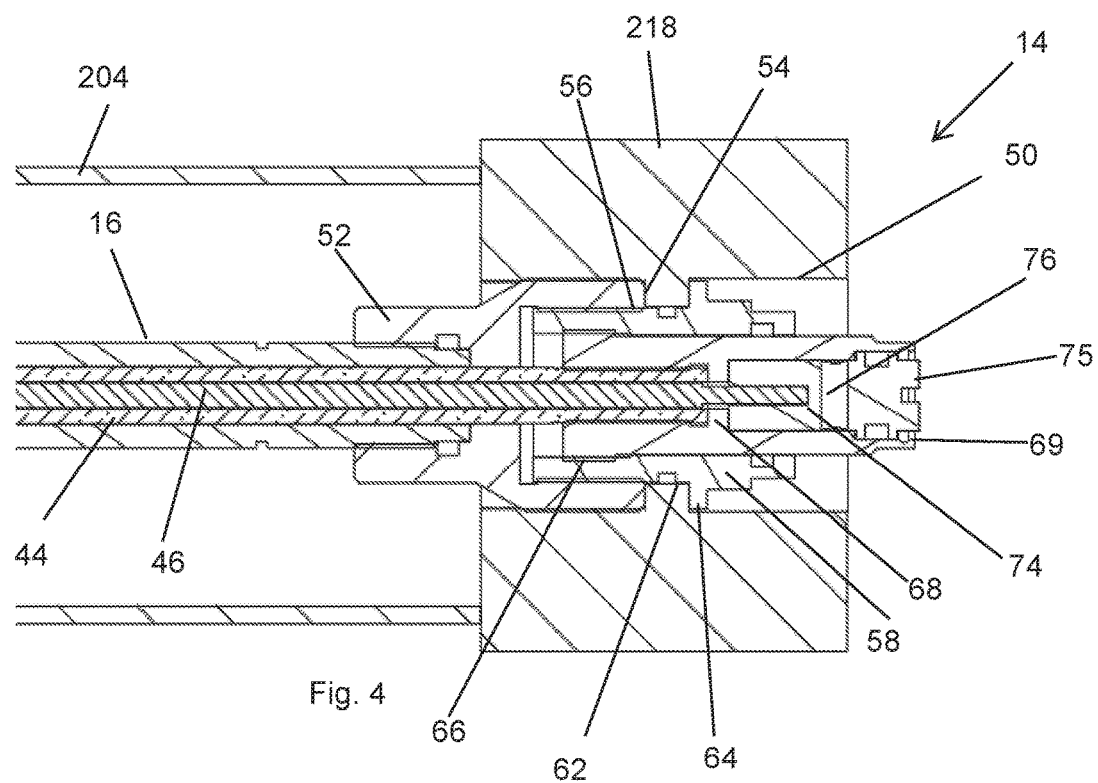

The components just described are shown in greater detail in the views of FIGS. 2, 3 and 4. As indicated above, mid-valve assembly 12 resides within cartridge tube 212 interiorly of base 214 and such that damper rod 16 extends through bore 216 in the base 214, as shown best in FIGS. 2 and 3. Damper rod 16 is fixedly attached to mid-valve assembly 12 and extends coaxially into a top out bumper 18, a rod cap 20; the interior end of the damper rod abuts a shoulder 21 formed on adjacent rod cap 20. An adjustment spring 22 is located between a shoulder 24 on rod cap 20 and applies outwardly directed pressure between the rod cap and a pressure plate 25. The pressure plate 25 encircles a cylindrical portion 27 of the rebound tap adjacent shoulder 24 and is movable on the cylindrical portion. The pressure plate 25 is normally urged away from the rod cap 20 as the adjustment spring 22 applies pressure between shoulder 24 and pressure plate 25. A valve body or piston 26 is attached to a nipple or stem 28 that extends from rebound tap 19 and the outer circumference of the piston 26 is sealed to the interior circumference surface 30 of cartridge tube 212 with a wear ring or piston band 32. It will be thus appreciated that the cartridge tube functions as a guide for the piston 26. A nut 34 is threaded onto the end of stem 28 to secure the piston 26 to the rod cap with rebound shims 36 captured therebetween and held against the piston with the nut 34. The mid-valve shims 38 are retained against the opposite side of piston 26, facing pressure plate 25, and there are two fluid pathways through the piston, namely, the rebound circuit 40 and the compression circuit 42. Fluid—typically hydraulic fluid, flows through the rebound circuit 40 and the compression circuit 42 as is known in the art and in the directions of the arrows A and B in FIG. 3 in the respective rebound and compression circuits 40 and 42.

A mid-valve adjustment rod 44 extends coaxially in the interior of damper rod 16 and is rotatable therein. A rebound adjustment rod 46 extends coaxially in the interior of the mid-valve adjustment rod 44 and is separately rotatable therein. The "lower" ends of both the rebound adjustment rod 46 and the mid-valve adjustment rod 44—that is, the end of the rods toward the fork lug 218, extend through the fork lug so that they may be easily accessed and manipulated by a user. As detailed below, each of these adjustment rods 44 and 46 is separately rotatable by a user using conventional tools to adjust and tune the mid-valve assembly as desired.

The upper or interior end of the mid-valve adjustment rod 44 abuts a shoulder 80 formed on the rebound tap 19 and the rebound tap is longitudinally movable in the mid-valve assembly 12 when the mid-valve adjustment rod 44 is rotated by the user. Accordingly, as the mid-valve adjustment rod 44 moves longitudinally in response to a user rotating the rod the movement causes like longitudinal movement of the rebound tap and the components that are attached to and/or movable with the rebound tap, namely, piston 26 and associated components.

The upper or interior end 45 of rebound adjustment rod 46 is threaded into a rebound needle 70 at threaded portions 78 and 79 of the adjustment rod and the rebound needle, respectively. When the rebound adjustment rod 44 is manipulated (as detailed below) by a user rotating the rod, the rod is driven longitudinally and therefore the rebound needle 70 is moved into and out of the mid-valve assembly 12. More specifically, rebound needle 70 moves longitudinally relative to an orifice 73 when the rebound adjustment rod 44 is rotated by virtue of the threaded engagement between threaded portion 78 of adjustment rod 44 and a threaded interior 79 portion of the needle 70—FIG. 5.

This reciprocating movement caused by user-manipulation causes the rebound needle 70 to move toward or away from the orifice 73 to adjust the flow of fluid through the orifice at a bleed port 72.

Turning to FIGS. 4 and 6, as noted, the lower end of the adjustment mechanism 10 defines the adjuster assembly 14 that is associated with fork lug 210. The fork lug assembly 218 is fixed to the inner fork tube 204 and the adjuster assembly 14 extends through a bore 50 in fork lug 210 that is coaxial with the inner fork tube 204. More specifically, the damper rod 16, the rebound adjustment rod 46 and the mid-valve adjustment rod 44 are connected to the fork lug 210 with a threaded coupler nut 52 in the interior of the inner fork tube 204; the damper rod 16 is not rotatable relative to the fork lug. The coupler nut 52 has an outer facing end 54 that defines a threaded seat 56 that receives a base bolt 58. The exterior lip 60 of outer-facing end 54 abuts a circumferential shoulder 62 on fork lug 210 and a circumferential lip 64 on base bolt 58 abuts the opposite side of shoulder 62 when the base bolt is threaded into the threaded seat 56 of the coupler nut, thereby securing the adjuster assembly 14 to the fork lug. The base bolt 58 has a threaded interior 66 and a mid-valve adjuster 68 is threaded into the threaded interior 66.

The internal end of the mid-valve adjuster 68 is fixedly connected to the mid-valve adjustment rod 44 and the exterior end 69 of the mid-valve adjuster 68 defines a user-accessible adjustment member; when the mid-valve adjuster 68 is rotated by a user manipulating exterior end 69 the opposite end of the mid-valve adjustment rod is driven into or out of (depending upon the direction of rotation of the adjuster) the mid-valve assembly 12 as described above. The exterior end 69 may beneficially be formed as a hexagonal member so that a standard wrench may be used to rotate the mid-valve adjustment rod 44 (see FIG. 7), and written indicia may be provided so that the user may adjust the mechanism to a known setting.

Figure 7:
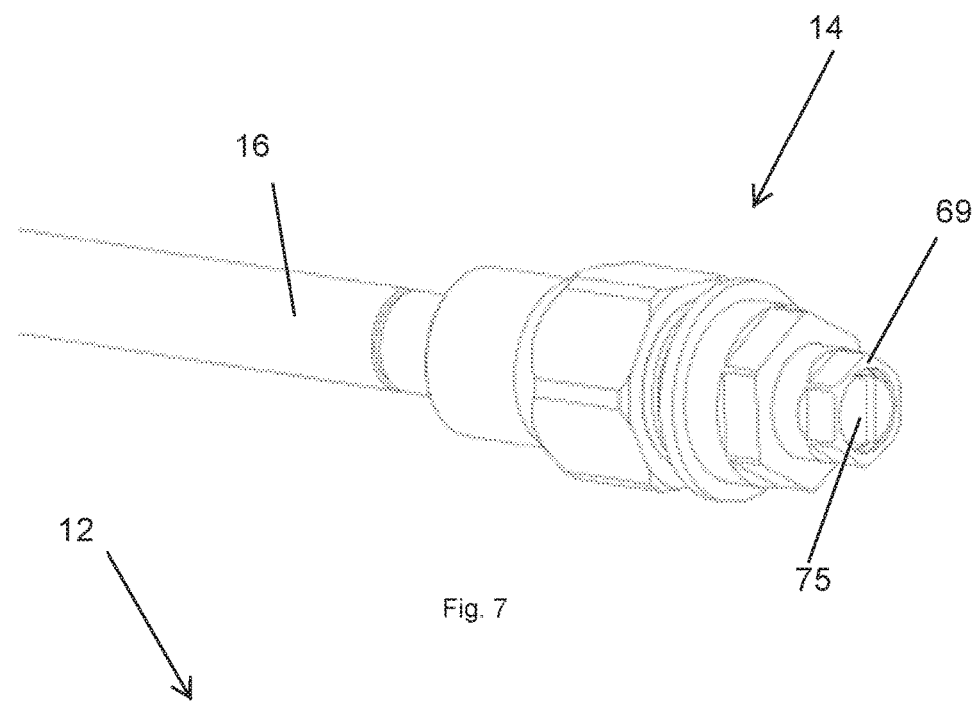
FIG. 7 is a perspective view of the adjuster portion of the mid-valve adjustment system illustrating the user-activated structures.

A rebound adjuster 74 is connected coaxially into the interior of the mid-valve adjuster 68 with a circlip (not shown) that allows the rebound adjuster 74 to rotate independently of the mid-valve adjuster 68. The rebound adjustment rod 46 is attached to the rebound adjuster 74 with a sliding joint 77 that enables the adjuster 74 to transmit torque as the adjuster is rotated while allowing the rebound adjuster rod 46 to be able to move longitudinally (i.e., left and right in FIGS. 4 and 6) by virtue of a threaded engagement on the adjustment needle 70 at the opposite (i.e., interior or upper) end of the adjustment rod 46 at threaded portions 78 and 79. The exterior end 75 of the adjuster 74 defines an exposed, user-accessible adjustment member; when the adjuster 74 is rotated by a user the opposite end of the rebound adjustment rod 46 is driven into or out of (depending upon the direction of rotation of the adjuster 74) the mid-valve assembly 12 as described above. Namely, rotation of the rebound adjustment rod 46 moves rebound needle 70 in relation to orifice 73 to adjust the amount of fluid that may flow through the bleed port 72. The rebound adjuster 74 includes a conventional slot that may be engaged with a standard screw driver to rotate the mid-valve adjustment rod. FIG. 7. A detent mechanism 76 allows the user to control position of rotation of the exterior end 75 incrementally as desired.

The mid-valve adjustment mechanism 12 described above and shown in the drawings operatively connects external, user-accessible and visible components at the bottom of the fork lug with components inside the fork 200 that mechanically increase or decrease compression damping generated at the mid-valve assembly 12, thereby providing the user with the ability to tune the damper/suspension component. Tuning the adjustment mechanism 10 is a simple operation utilizing the present invention. Mid-valve adjustment assembly 12 is adjusted by rotating the mid-valve adjuster 68 (by the user manipulating the exterior end 69 of the mid-valve adjuster) clockwise to thereby engage the threaded connection between threaded interior 66, base bolt 58 and the mid-valve adjuster 68; mid-valve adjuster 68 and mid-valve adjustment rod 44 are fixed together. This causes the mid-valve adjustment rod 44 to thread outward away from the adjuster body (left-hand threads are used). Several components are semi-permanently connected to the mid-valve assembly 12: mid-valve adjustment rod 44, rebound tap 19, valve piston 26 and rebound shims 36 and mid-valve shims 38, and nut 34. As this group of components moves downward relative to the rest of the fork as the mid-valve adjuster 68 is rotated by the user, the mid-valve shims 38 are brought into contact with pressure plate 25. This position is shown in the cross sectional view of FIG. 5. Stated another way, in FIG. 5 the mid-valve adjustment assembly 12 is in the closed position and the adjustment spring 22 is under tension. In this position the pressure plate 25 exerts pressure on the mid-valve shims 38. The rebound needle 70 is illustrated in the closed position so that the bleed port 72 is closed. The rebound needle 70 stays in the same position relative to the bleed port orifice 73 as the mid-valve is adjusted. The farther the adjuster is rotated, the more adjustment spring 22 is compressed and the greater pressure it exerts against the stack of shims defining mid-valve shims 38, thereby stiffening the assembly and its operating characteristics. It will further be noted that in FIG. 5 the rebound adjustment rod 46 is in a position such that the rebound needle 70 is adjusted so that the bleed port 72 is closed. This is in contrast to the position of the rebound needle 70 illustrated in FIG. 3 where the rebound adjustment rod has been adjusted so that the rebound needle 70 is withdrawn so that the bleed port 72 is open.

The example shown in the drawings utilizes a clamped shim design in mid-valve assembly 12, meaning that there is no float. In the full soft position, the pressure plate 25 does not contact the mid-valve shims 38, so that the shims can bend freely without any influence from the pressure plate. When the adjuster is tightened a small amount, the pressure plate 25 moves closer to the shims 38, so that the plate 25 contacts the shims when the shims 38 flex away from the adjacent face of valve piston 26 during a compression event. This stiffens the valve during suspension movements that flex the shims far enough to contact the pressure plate.

As the mid-valve adjuster 68 is tightened further, the pressure plate 55 comes into the contact with the shims 38 while they are in the flat and unstressed, non-flexed position. In this position it becomes necessary to deflect both the shims 38 and the pressure plate 25 in order to open the valve, making the valve stiffer yet. At tighter adjustment settings, the adjustment spring 22 becomes preloaded, increasing both the initial valve opening force and the force required to further deflect the shims. This adjustment scheme is highly effective, and covers a wide range of settings useful to the rider.

The exact design of the mid-valve pressure plate, shim stack configuration, stiffness and size of the mid-valve adjustment spring all affect the function of the adjuster. In practice, these components are all fine-tuned to deliver the desired damping characteristics at different stiffness settings.

Figure 8:
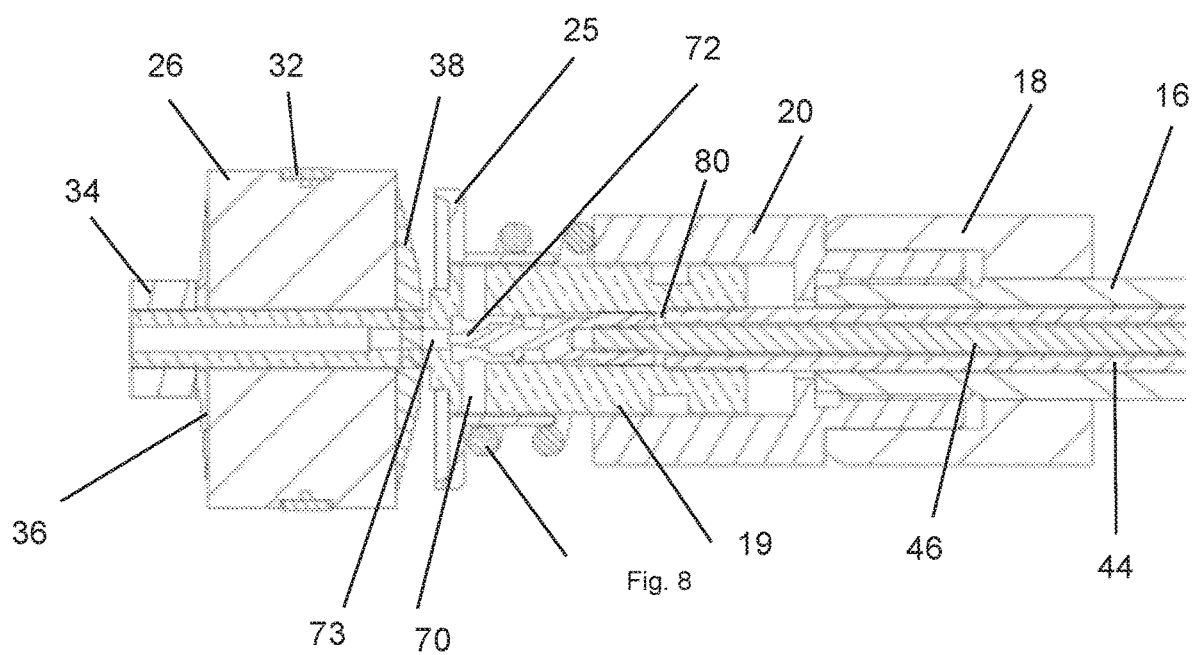
FIG. 8 is a cross sectional view of the mid-valve portion of the mid-valve adjustment system according to the invention similar to the view of FIG. 5 except in FIG. 8 the pressure plate is spaced apart from the mid-valve shims.
Figure 9:
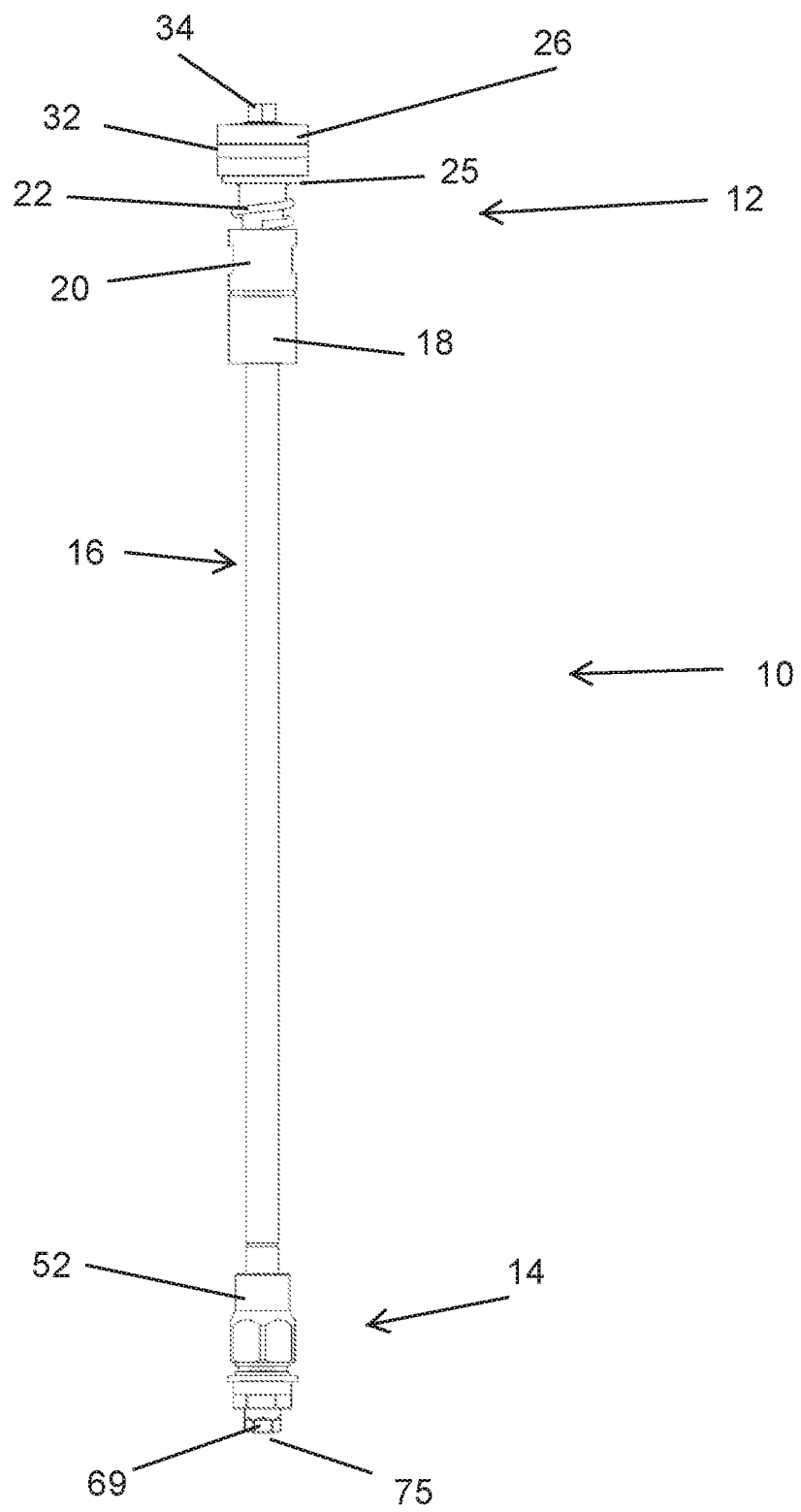
FIG. 9 is an elevation view illustrating the mid-valve adjustment mechanism of the present invention separated from the fork components.

Turning to FIG. 8, the mid-valve assembly 12 has been adjusted to an open position in which the pressure plate 25 is spaced apart from the mid-valve shims 38. In this position the adjustment spring 22 is neutral, neither under compression nor tension. The adjustment spring is compressed when the mid-valve assembly 12 is drawing downwardly, putting tension on the spring that is transmitted to the mid-valve shims 38. And in FIG. 8 the rebound adjustment rod 44 has been adjusted so that the rebound needle 70 is spaced apart from orifice 73 so that bleed port 72 is open.

Use of the spring and pressure plate mechanism as described above thus allows adjustment of damping in a mid-valve. Moreover, in the mid-valve adjustment mechanism described herein the rebound needle is used to adjust rebound damping instead of low-speed compression damping.

The rebound adjuster assembly 14 operates independently of the mid-valve adjustment assembly 12 but it will be appreciated that the entire rebound adjustment assembly 14 moves simultaneously and in tandem with the mid-valve adjustment assembly 12 when it is adjusted as described above, so regardless of what setting is used for the mid-valve adjustment, rebound damping performance remains consistent. The reverse is also true: adjustment of the rebound adjustment assembly 14 has no effect on the mid-valve adjustment system. Said another way, adjustment of the mid-valve adjustment assembly 12 to causes movement of piston 26 results in simultaneous movement of the rebound needle 70 but the position of the rebound needle relative to the orifice 73 is not changed, and vice versa.

Figure 10:
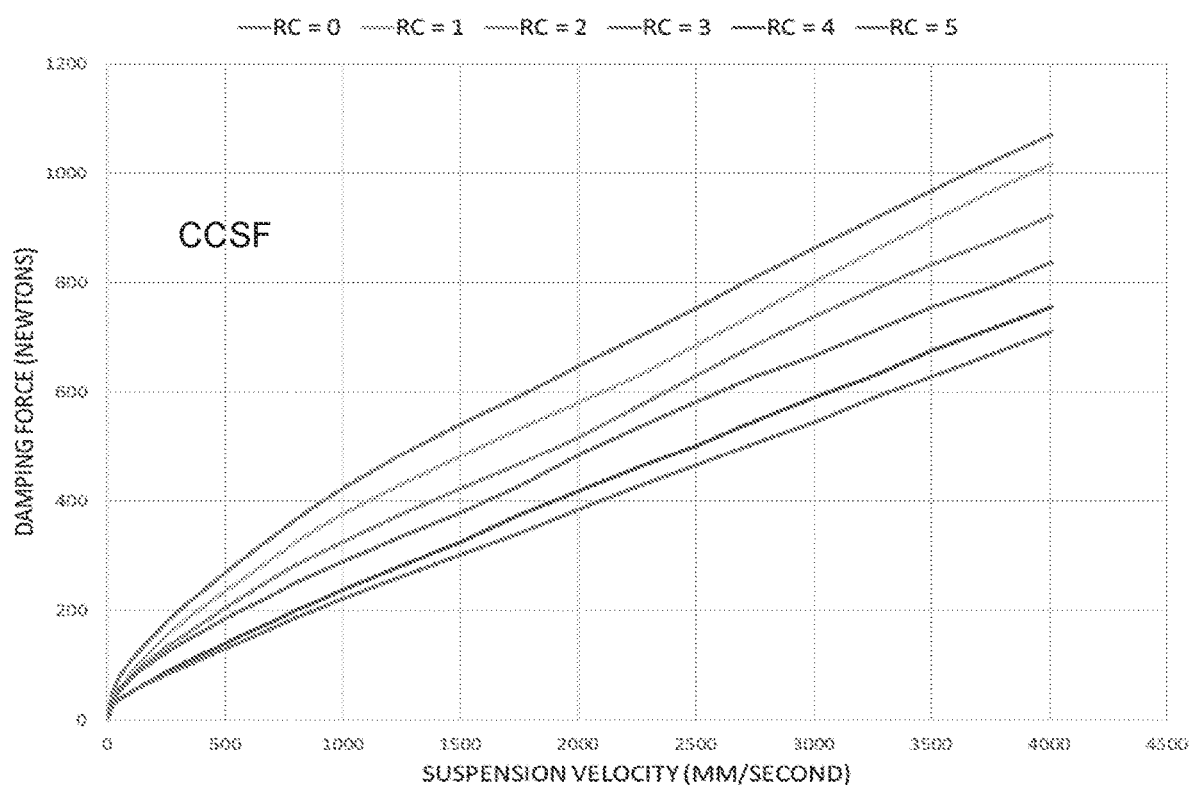
FIGS. 10 and 11 are plots of performance data for a CCSF fork. Specifically.
Figure 11:
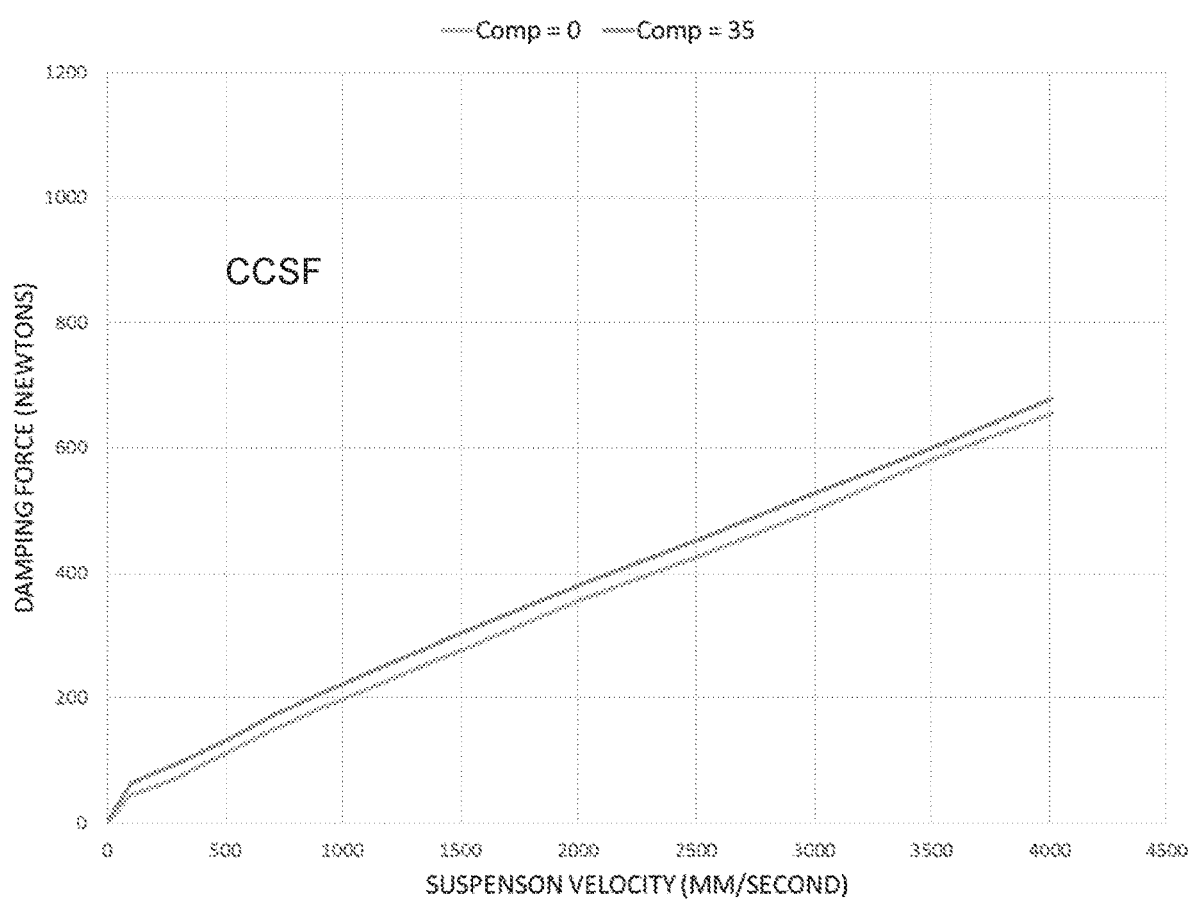

Various performance data for a damper in which a mid-valve adjustment mechanism 10 according to the invention has been installed in a CCSF fork are presented in graphic form in the series of FIGS. 10 and 11. In FIG. 10 the suspension comprises a CCSF fork that utilizes a mid-valve adjustment mechanism 10 according to the present invention and illustrates the adjustment range. In contrast, the graph in FIG. 11 illustrates a CCSF fork that incorporates a conventional compression adjuster. The performance increases provided by the mid-valve adjustment mechanism 10 according to the present invention are clearly shown in the performance data.

2. OCSF; Open Cartridge Suspension Fork

As noted previously, the revalve adjustment mechanism 10 works similarly in an OCSF to the embodiment of FIGS. 1 through 9, but in an OCSF the mechanism is inverted and the valve stiffening mechanism uses mid-valve float adjustment instead of a pressure plate to adjust damping. An OCSF type of fork requires lower mid-valve forces due to its valve and cartridge dimensions, and the unpressurized design. Normal shim configurations used with an OCSF design usually include float values in the range of 0.2 to 1.5 mm. This embodiment of the invention is illustrated specifically in FIGS. 12 through 15 and the same reference numbers are used throughout the specification to identify like components.

Figure 12:
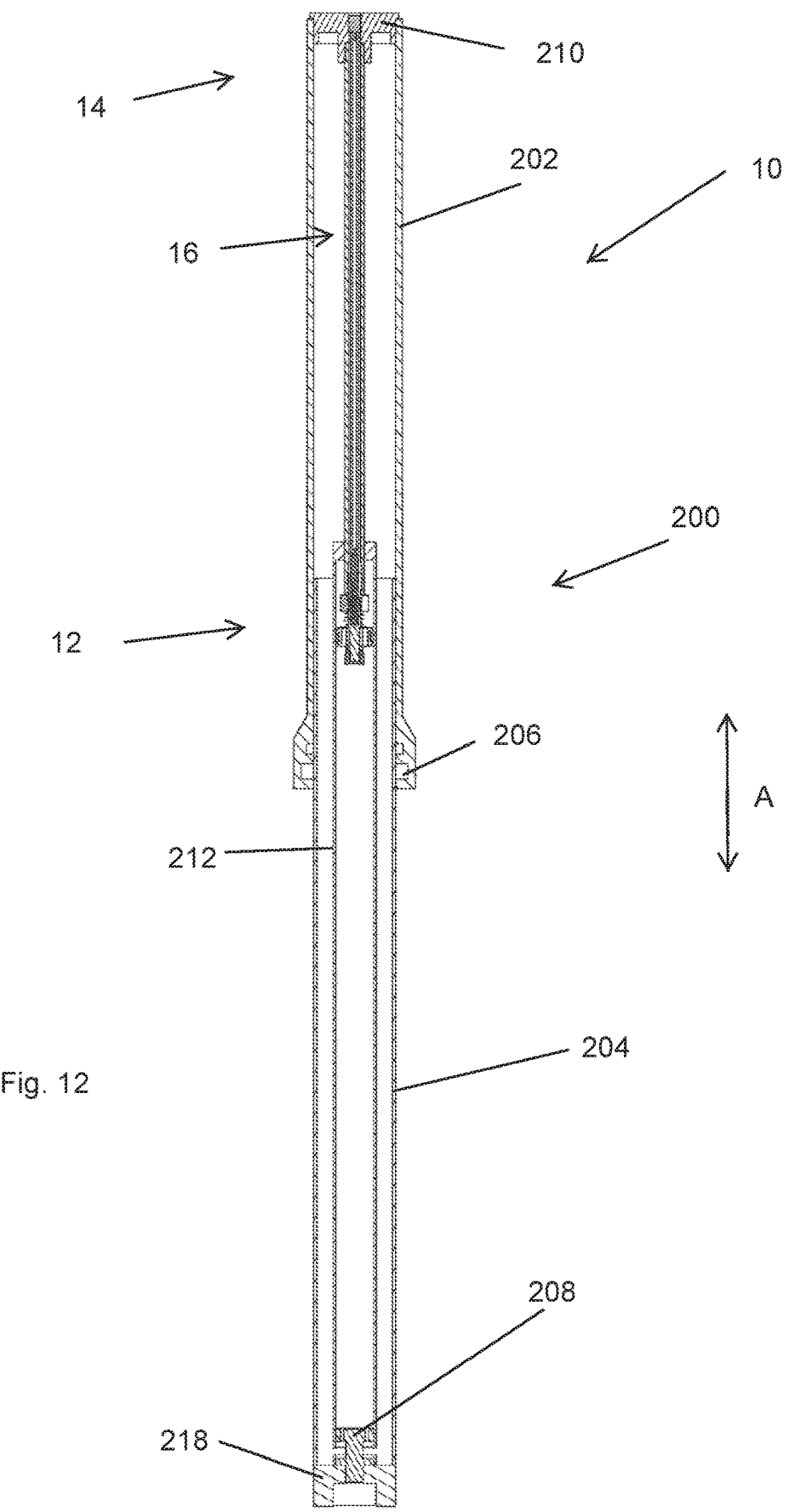
FIGS. 12 through 15 illustrate the external mid-valve adjustment system according to the present invention as it is embodied in an "open cartridge suspension fork" ("OCSF"). Specifically.
Figure 13:
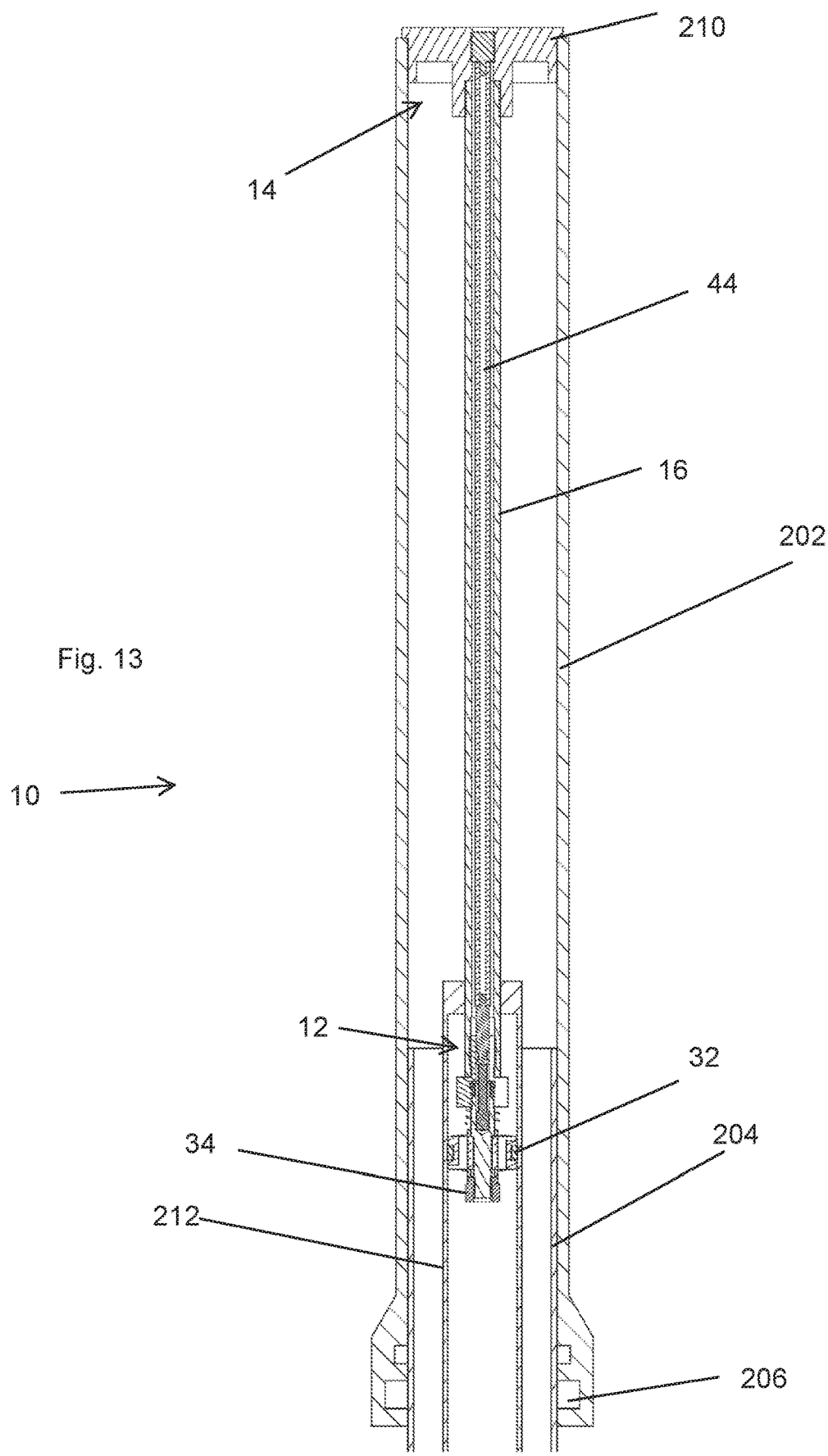
Figure 14:
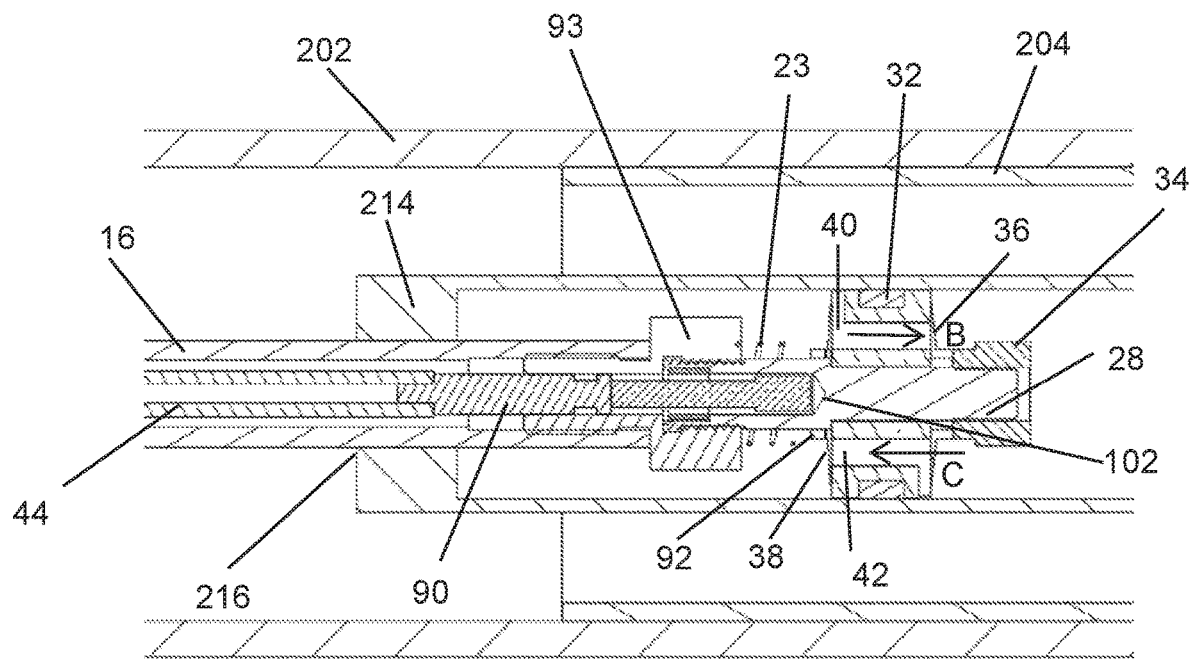

The relative inversion of the components in an OCSF fork compared to a CCSF fork is best seen with reference to FIG. 12. The fork 200 has an outer tube 202 and inner tube 204, but the base valve assembly 208 is fixedly located at the bottom of the inner tube 204, adjacent the fork lug 218. A cartridge tube 212 is carried in the inner tube 204 as shown with the lower end of the cartridge tube fixed to the fork lug 218, which serves as a cap to secure the cartridge tube in the inner tube 204. The mid-valve adjustment mechanism 12 is carried in the cartridge tube 212 with the mid-valve assembly 12 oriented oppositely of the same structure in the CCSF fork, and the adjuster assembly 14 positioned at the top of the fork and accessible through the fork cap 210 rather than through the fork lug 218 as with the CCSF fork. The damper rod 16 includes an externally accessible adjuster, detailed below, which is accessed by the user through the fork cap 210. The mid-valve assembly 12 shown in the OCSF fork herein does not include the rebound adjustment components as the rebound adjustment is not required in the illustrated embodiment of the fork. It may be noted nonetheless that a rebound adjuster may be necessary and used in different OCSF designs and the same mechanisms described above and as shown in FIGS. 1 through 9 may be used with an OCSF fork such as that shown in FIGS. 12 through 15.

The mid-valve adjustment rod 44 is concentrically and rotatably retained in damper tube 16 in the same manner as described above and is coupled to the mid-valve assembly 12 with a mid-valve coupler 90; the damper rod abuts a shoulder on the mid-valve base 93. The mid-valve assembly 12 used with the OCSF fork does not include a pressure plate 25. Instead, a check spring 23 is captured between the mid-valve shims 38 and the mid-valve base 93. As the mid-valve assembly 12 is adjusted, the float adjustment star 92 moves relative to the piston 26, contracting or expanding the distance the mid-valve shims 38 are able to displace freely away from the piston 26 during a compression stroke. On the OCSF fork shown in FIGS. 12 through 15, the check spring 23 does not apply any significant pressure to the shims regardless of the adjustment setting. Instead, the check spring 23 only serves to close the float gap and close the valve when a compression stroke ends and a rebound stroke begins. The shims have to cover the compression ports during rebound flow.

Figure 15:
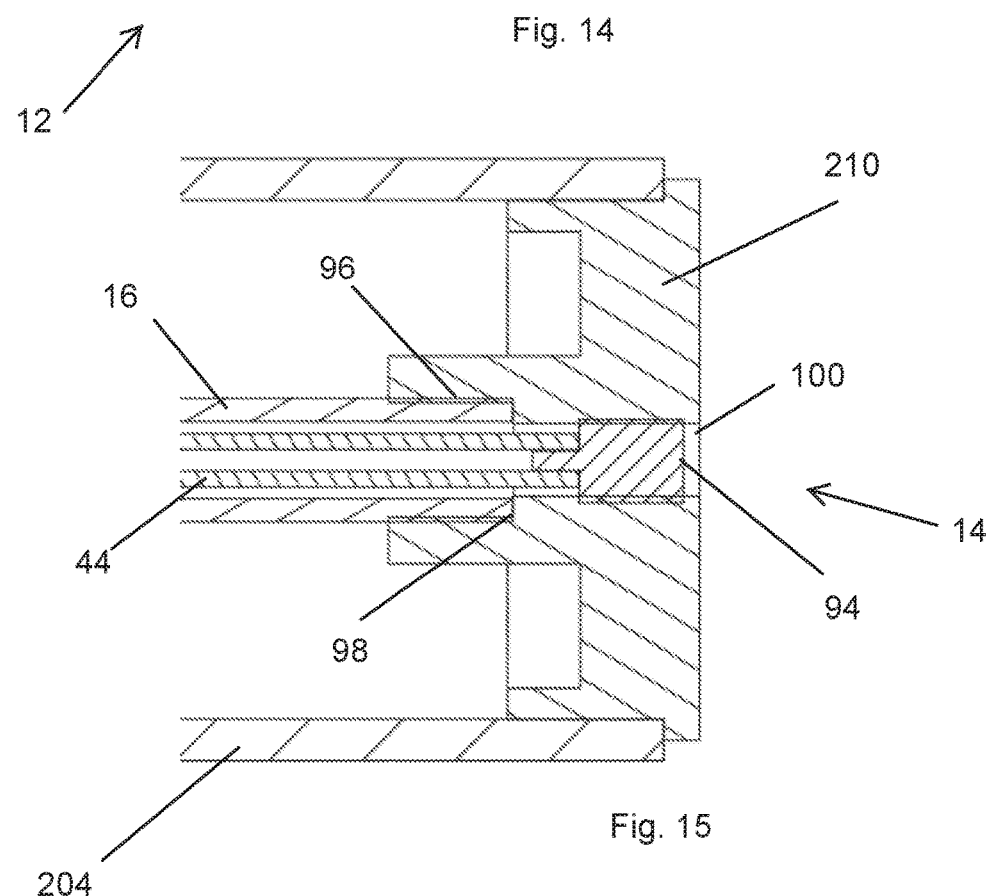

The adjuster assembly 12 is shown in FIG. 15 and as noted above, is part of the fork cap 210 and is accessible at the top of the fork 200 when the OCSF fork is mounted on a motorcycle. The damper rod 16 terminates in a seat 96 formed in the fork cap 210 and abuts a shoulder 98. The mid-valve adjustment rod 44 extends further into the fork cap 210 as shown and connects to a mid-valve adjustment screw 94 that is threaded into a bore 100 in cap 210. The screw 94 defines the user-manipulated component that the user rotates to adjust the mid-valve assembly 12 and to thereby tune the mechanism—as noted, the adjustment screw 94 is coupled to the mid-valve rod 44.

When mid-valve adjustment screw 94 is rotated clockwise, the threaded connection between the screw 94 and fork cap 210 causes the screw to move inwardly relative to the fork cap and all external parts connected to it move in the same direction. As the mid-valve adjustment rod 44 is translated longitudinally the end of the rod presses against the mid-valve coupler 90 and adjustment star 92. The adjustment star 92 sets the float limit, in other words, the distance mid-valve shims 38 may freely displace away from the piston 26 before encountering a hard stop. During a compression event, first the float value is maximized as fluid begins to flow through the valve. As pressure and flow volume increases, the shims begin to restrict flow and generate damping. Large float values create less restriction and less damping; less or no float creates more damping.

Rebound tap 19 has a collar 102 that piston 26 rests upon. The inside diameter of the bore through the mid-valve shims 28 is larger than the outer diameter of the collar 102 so the shims 38 can move freely up and down the rebound tap 19 (i.e., "float"). Check spring 23 closes the valve upon backflow (rebound), in order to channel fluid into the rebound ports during fork extension. The check spring 23 is designed to help close the valve during rebound, but is not stiff enough to provide significant resistance to flow in the compression direction. The shim configuration and float value determined by the position of the float adjustment star are the main factors influencing the amount of compression damping generated by the valve.

Figure 16:
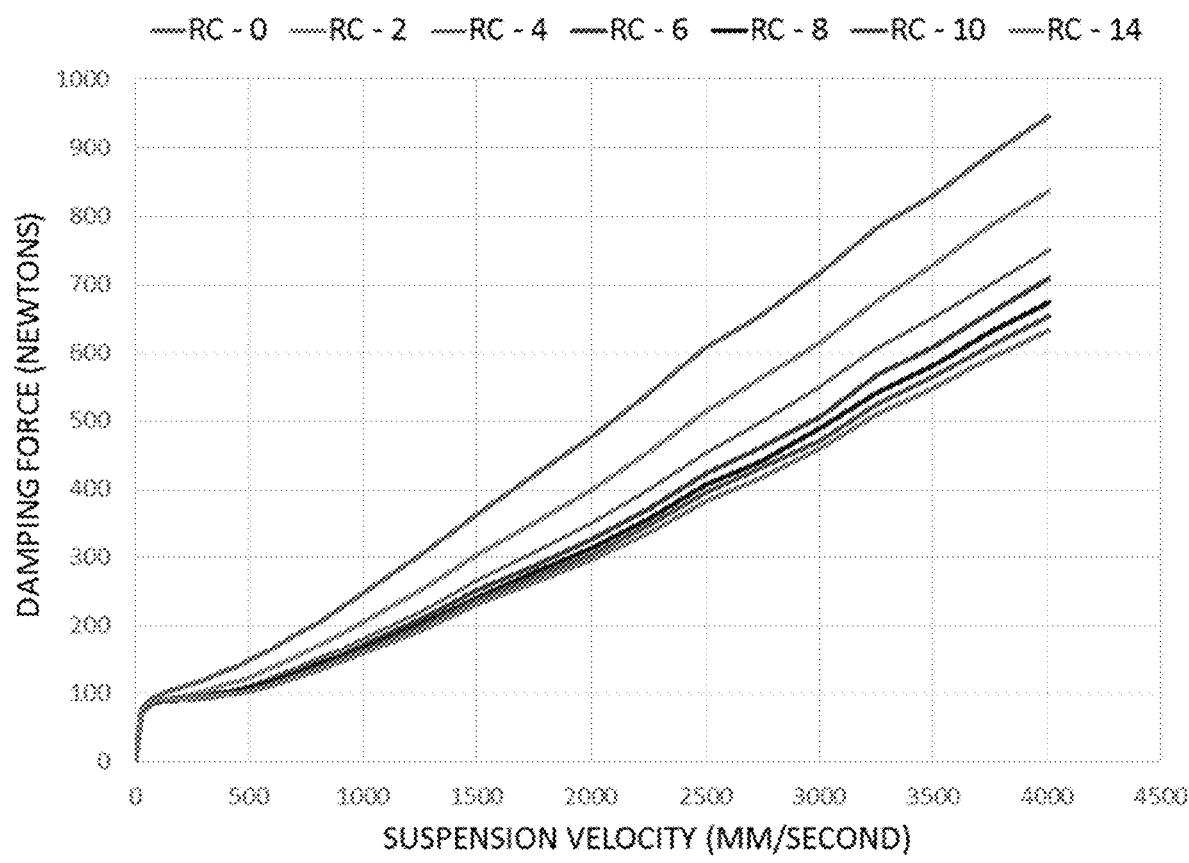
FIGS. 16 and 17 are plots of performance data for an OCSF fork. Specifically.
Figure 17:
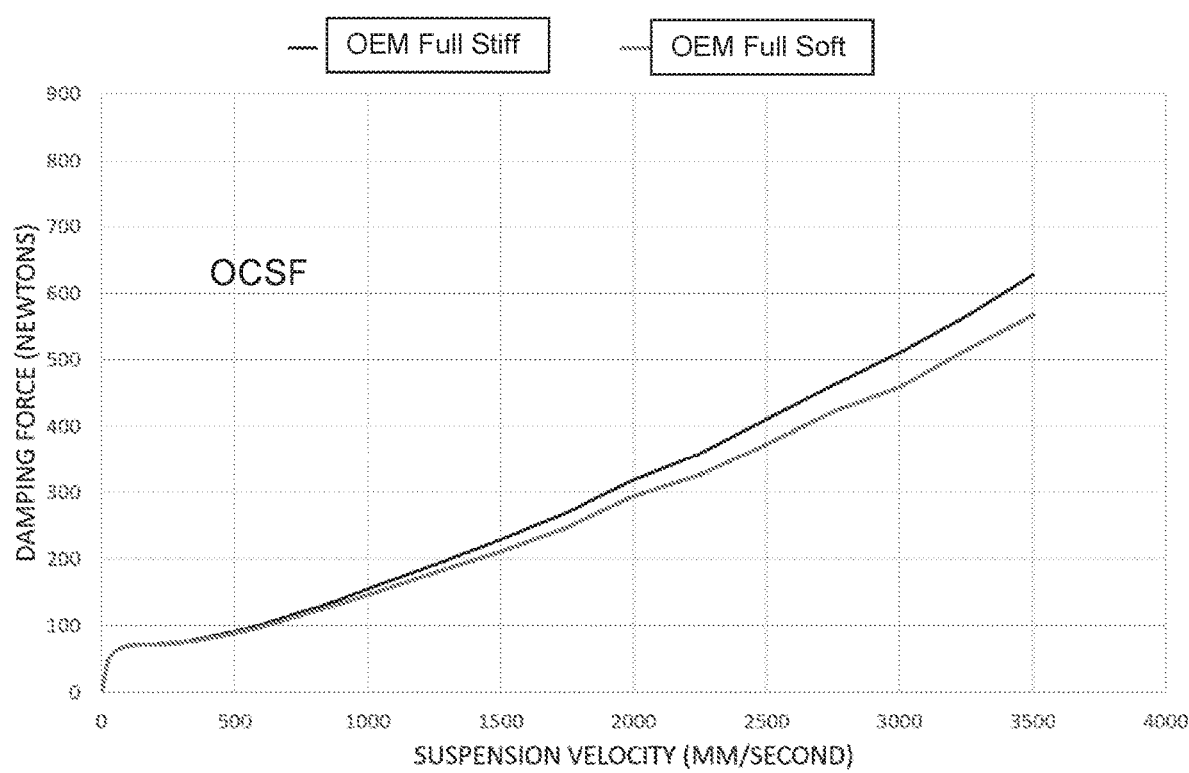

Referring now to FIGS. 16 and 17, plots of data for an OCSF fork are shown. In FIG. 16 the adjustment range data from an OCSF fork comprising the revalve adjustment mechanism 10 according to the invention are shown. Contrasting with FIG. 16, in FIG. 17 the adjustment range data from an OCSF fork utilizing a conventional suspension system are shown (i.e., "OEM").

Those of ordinary skill in the art will recognize that certain modifications may be made to the apparatus and methods described above to achieve equivalent functionality, without departing from the scope of the inventions described herein. As an example of such equivalency, the structures described above that enable a user to access the mid-valve adjustment rod externally and rotate the rod to cause longitudinal movement of the rod and associated adjustment of the damping force may be replaced by other structures that cause the rod to move longitudinally. Thus, a threaded mechanism that causes longitudinal movement of the rod may be replace by another mechanism that causes longitudinal movement of the mid-valve adjustment rod, such as a cam or a ratcheted drive. A hydraulically-actuated drive mechanism or a drive mechanism using an electric motor could also be used to drive longitudinal movement of the mid-valve adjustment rod to achieve the same functionality.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. An apparatus for adjusting damping force created by a bi-directional mid-valve assembly in a suspension system, comprising:
   a bi-directional mid-valve assembly operable to create compression damping force with a mid-valve compression damping component on a first side of a piston, and rebound damping force with a rebound damping component on a second side of the piston;
   an elongate damping rod having a first end coupled to the bi-directional mid-valve assembly and a second end;
   a mid-valve compression damping component adjustment rod received in and longitudinally movable in the elongate damping rod, the mid-valve compression damping component adjustment rod having a first end interacting with the mid-valve compression damping component and a second end;
   a user-accessible first actuator having a first end in contact with the second end of the mid-valve compression damping component adjustment rod, and a second end;
   wherein the mid-valve compression damping component is adjusted by manipulating the first actuator to thereby cause longitudinal movement of the mid-valve compression damping component adjustment rod to thereby adjust the compression damping force created by the bi-directional mid-valve assembly;
   a rebound adjustment rod received in and longitudinally movable in the mid-valve compression damping component adjustment rod, the rebound adjustment rod having a first end interacting with a bleed orifice in the bi-directional mid-valve assembly, and a second end;
a user-accessible second actuator having a first end in contact with the second end of the rebound adjustment rod, and a second end;
wherein the mid-valve compression damping component adjustment rod is coaxially received in the elongate damping rod and the first actuator is concentric with the mid-valve compression damping component adjustment rod.

2. The apparatus according to claim 1 in which rotation of the mid-valve compression damping component adjustment rod in a first rotational direction causes the first end of the mid-valve compression damping component adjustment rod to move longitudinally in a first direction and rotation of the mid-valve compression damping component adjustment rod in a second rotational direction causes the first end of the mid-valve adjustment compression damping component rod to move longitudinally in a second direction that is opposite the first direction.

3. The apparatus according to claim 2 in which the rebound adjustment rod is rotatably received in the mid-valve compression damping component adjustment rod and longitudinally movable therein, and the user-accessible second actuator is concentric with the rebound adjustment rod and the mid-valve compression damping component adjustment rod.

4. The apparatus according to claim 3 in which rotation of the rebound adjustment rod in a first rotational direction causes the rebound adjustment rod to move longitudinally in a first direction and rotation of the rebound adjustment rod in a second rotational direction causes the rebound adjustment rod to move longitudinally in a second direction that is opposite of the first direction.

5. The apparatus according to claim 4 in which rotation of the user-accessible second actuator in a first rotational direction causes rebound adjustment rod to move longitudinally in a first direction and rotation of the user-accessible second actuator in a second rotational direction causes the rebound adjustment rod to move longitudinally independently of the mid-valve compression damping component adjustment rod.

6. The apparatus according to claim 5 wherein the first end of the rebound adjustment rod defines a rebound needle that moves toward the bleed orifice in the bi-directional mid-valve assembly when the rebound adjustment rod is rotated in the first rotational direction and the rebound needle moves away from the bleed orifice when the rebound adjustment rod is rotated in the second rotational direction.

7. The apparatus according to claim 6 in which the piston, rebound needle and bleed orifice are longitudinally movable together by rotation of the mid-valve compression damping component adjustment rod.

8. The apparatus according to claim 7 wherein longitudinal movement of the rebound needle by rotation of the rebound adjustment rod is independent of longitudinal movement of the piston.

9. The apparatus according to claim 7 further comprising:
a fork tube defined by an outer fork tube and an inner fork tube that is reciprocally slidable in the outer fork tube, each of the outer and inner fork tubes having first and second opposite ends and each of the outer and inner fork tubes having a cap attached to one of the first or second opposite ends;
a cartridge tube received in a selected one of the inner or outer fork tube;
wherein the bi-directional mid-valve assembly is received in the cartridge tube, the second end of the elongate damping rod is connected to a first one of the caps, the second end of the user-accessible first actuator is accessible through an exterior of the first one of the caps, and the second end of the user-accessible second actuator is accessible through the exterior of the first one of the caps.

10. The apparatus according to claim 9 in which the first one of the caps is defined by a fork lug.

11. The apparatus according to claim 9 in which the first one of the caps is a fork tube cap.

12. The apparatus according to claim 11 in which the mid-valve adjustment rod is accessible through a bore in the fork tube cap.

13. A method of adjusting a bi-directional mid-valve assembly in a suspension system having a fork, the fork having an upper end and a lower end and the fork defined by an outer fork tube having an upper and lower end and an inner fork tube having an upper and lower end, the upper end and the lower end of the fork each having an end cap, and a cartridge tube within the inner fork tube and attached to a selected one of the end caps, comprising the steps of:
a. forming a bore through a selected one of the end caps;
b. locating a bi-directional mid-valve assembly in the fork in the cartridge tube;
c. extending a damping rod from the bi-directional mid-valve assembly to the end cap opposite of the end cap to which the cartridge tube is attached;
d. inserting a bi-directional mid-valve assembly compression damping adjustment rod coaxially and rotatably into the damping rod so that a first end of the mid-valve assembly compression damping adjustment rod interacts with a compression damping component and so that a second end of the mid-valve assembly compression adjustment rod is accessible externally of the selected one of the end caps;
e. longitudinally moving the mid-valve assembly compression damping adjustment rod to thereby adjust the compression damping of the mid-valve assembly.

14. The method according to claim 13 including the step of inserting a rebound damping component adjustment rod coaxially and rotatably into the mid-valve assembly compression damping adjustment rod so that a rebound needle at a first end of the rebound damping component adjustment rod interacts with an orifice in the bi-directional mid-valve assembly and so that a second end of the rebound damping component adjustment rod is accessible externally of the selected one of the end caps, and in which the step of manipulating the mid-valve assembly compression damping adjustment rod further comprises accessing the second end of the mid-valve assembly compression damping adjustment rod externally of the selected one of the end caps.

15. The method according to claim 14 wherein the step of rotating the mid-valve assembly compression damping adjustment rod moves the bi-directional mid-valve assembly relative to the damping rod and causes movement of the rebound needle and orifice simultaneously with movement of the piston but does not change the position of the rebound needle relative to the orifice.

16. An adjustment apparatus for a suspension system, comprising:
a fork having an outer fork tube and an inner fork tube that is reciprocally slidable in the outer fork tube, each of the outer and inner fork tubes having opposite ends and a cap attached to one of the opposite ends of each of the outer and inner fork tubes;

a cartridge tube in the fork, the cartridge tube having opposite first and second ends with one of either the first or second ends attached to the cap of one of either the outer or inner fork tubes and the opposite end of the cartridge tube not fixed;

a bi-directional mid-valve assembly in the cartridge tube, the bi-directional mid-valve assembly coupled by a damping rod to the cap of the one of either the outer fork tube or the inner fork tube to which the cartridge tube is not fixed;

a bi-directional mid-valve assembly compression damping adjustment rod received and movable in the damper rod, the bi-directional mid-valve assembly compression damping adjustment rod operable to adjust bi-directional mid-valve assembly compression damping and having a first end coupled to the bi-directional mid valve assembly and a second end in contact with a bi-directional mid-valve assembly compression damping adjuster that is accessible at the cap of the one of either the outer fork tube or the inner fork tube to which the cartridge tube is not fixed so that manipulation of the bi-directional mid-valve assembly compression damping adjuster causes movement of the bi-directional mid-valve assembly compression damping adjustment rod.

17. The adjustment apparatus according to claim 16 in which the cap of the one of either the outer fork tube or the inner fork tube is defined by a fork lug fixed to a lower end of the inner fork tube.

18. The adjustment apparatus according to claim 16 in which the cap of the one of either the outer fork tube or the inner fork tube is defined by a fork cap fixed to an upper end of the outer fork tube.

19. The adjustment apparatus according to claim 16 further comprising a bi-directional mid-valve assembly rebound damping adjustment rod coaxially and rotatably received in the bi-directional mid-valve assembly compression damping adjustment rod, the bi-directional mid-valve assembly rebound damping adjustment rod having a first end defining a rebound needle in the bi-directional mid-valve assembly and a second end defining a rebound damping adjuster that is accessible at the cap of the one of either the outer fork tube or the inner fork tube to which the cartridge tube is not fixed so that manipulation of the rebound damping adjuster causes movement of the bi-directional mid-valve assemble rebound damping adjustment rod, and wherein the bi-directional mid-valve assembly compression damping adjustment rod and bi-directional mid-valve assemble rebound damping adjustment rod are concentric to one another.

20. In a suspension system having a bi-directional mid-valve assembly designed to create compression and rebound damping, the improvement comprising:

a bi-directional mid-valve assembly comprising a piston, compression damping adjustment components on a first side of the piston and rebound damping adjustment components on a second side of the piston, the piston coupled to and longitudinally movable relative to a damping rod;

an externally accessible compression damping adjuster coupled to the compression damping components by a first rod coaxially and rotatably received in the damping rod so that rotation of the compression damping adjuster in a first direction increases the compression damping of the bi-directional mid-valve assembly and rotation of the compression damping adjuster in a second direction decreases compression damping of the bi-directional mid-valve assembly;

an externally accessible rebound damping adjuster coupled to the rebound damping components by a second rod coaxially and rotatably received in the first rod so that rotation of the rebound damping adjuster in a first direction increases the rebound damping of the bi-directional mid-valve assembly and rotation of the rebound damping adjuster in a second direction decreases rebound damping of the bi-directional mid-valve assembly; and wherein the piston is longitudinally movable relative to the damping rod.

21. The improvement according to claim 20 in which the suspension system is a closed cartridge suspension system.

22. The improvement according to claim 20 in which the suspension system is an open cartridge suspension system.

23. The improvement according to claim 20 in which the damper rod locates the bi-directional mid-valve assembly in a fork tube and the externally accessible compression damping is externally accessible through a fork lug at a lower end of the fork tube.

24. The improvement according to claim 20 in which the damper rod locates the bi-directional mid-valve assembly in a cartridge tube and the externally accessible compression damping is externally accessible through a fork cap at an upper end of the fork.

* * * * *